(12) United States Patent
Foo et al.

(10) Patent No.: US 8,937,888 B2
(45) Date of Patent: Jan. 20, 2015

(54) AUDIO SEQUESTERING AND OPT-IN SEQUENCES FOR A CONFERENCE SESSION

(75) Inventors: Ian Foo, Raleigh, NC (US); Jacqueline Munson, San Jose, CA (US); Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1894 days.

(21) Appl. No.: 11/726,933

(22) Filed: Mar. 23, 2007

(65) Prior Publication Data

US 2008/0232277 A1    Sep. 25, 2008

(51) Int. Cl.
*H04L 12/16* (2006.01)
*H04L 12/18* (2006.01)

(52) U.S. Cl.
CPC .................................. *H04L 12/1822* (2013.01)
USPC ........................ 370/260; 370/271; 379/202.01

(58) Field of Classification Search
CPC . H04L 12/18; H04L 12/1813; H04L 12/1818; H04L 12/1822; H04L 12/1827; H04L 29/06414; H04L 41/5093; H04L 65/1083; H04L 65/103; H04L 65/14038; H04L 67/143; H04L 67/145
USPC ......................................................... 370/260
See application file for complete search history.

(56) References Cited

U.S. PATENT DOCUMENTS

| | | |
|---|---|---|
| 5,729,687 A | 3/1998 | Rothrock et al. |
| 6,009,519 A | 12/1999 | Jones et al. |
| 6,014,427 A | 1/2000 | Hanson et al. |
| 6,236,854 B1 | 5/2001 | Bradshaw, Jr. |
| 6,243,454 B1 * | 6/2001 | Eslambolchi ............ 379/202.01 |
| 6,259,405 B1 | 7/2001 | Stewart et al. |
| 6,275,940 B1 * | 8/2001 | Edwards et al. .................. 726/2 |
| 6,342,903 B1 | 1/2002 | Fado et al. |
| 6,501,739 B1 | 12/2002 | Cohen |
| 6,545,596 B1 | 4/2003 | Moon |
| 6,590,604 B1 | 7/2003 | Tucker et al. |
| 6,608,820 B1 | 8/2003 | Bradshaw, Jr. |
| 6,671,262 B1 | 12/2003 | Kung et al. |
| 6,816,469 B1 | 11/2004 | Kung et al. |
| 6,865,540 B1 | 3/2005 | Faber et al. |
| 6,876,734 B1 | 4/2005 | Summers et al. |
| 6,885,900 B1 | 4/2005 | Rybicki et al. |
| 6,905,414 B2 | 6/2005 | Danieli et al. |
| 6,909,778 B2 | 6/2005 | Wengrovitz |
| 6,931,001 B2 | 8/2005 | Deng |
| 6,931,113 B2 | 8/2005 | Ortel |
| 6,985,745 B2 | 1/2006 | Quaid |
| 6,987,744 B2 | 1/2006 | Harrington et al. |
| 7,620,390 B2 * | 11/2009 | Vezza et al. ................ 455/414.1 |
| 2004/0162747 A1 | 8/2004 | Yeh et al. |
| 2004/0234046 A1 | 11/2004 | Skladman et al. |
| 2005/0135383 A1 | 6/2005 | Shenefiel |
| 2005/0157708 A1 | 7/2005 | Chun |

(Continued)

*Primary Examiner* — Alvin Zhu
(74) *Attorney, Agent, or Firm* — Baker Botts L.L.P.

(57) ABSTRACT

In one embodiment, a method includes electronically prompting, in response to a triggering event, a participant connected to a conference session via a corresponding endpoint device to enter an affirmative response in order to continue attending the conference session. The participant is disconnected from the conference session in the event that the affirmative response is not received within a predetermined time period. It is emphasized that this abstract is provided to comply with the rules requiring an abstract that will allow a searcher or other reader to quickly ascertain the subject matter of the technical disclosure.

28 Claims, 5 Drawing Sheets

(56) References Cited

U.S. PATENT DOCUMENTS

| | | |
|---|---|---|
| 2005/0177622 A1 | 8/2005 | Spielman et al. |
| 2005/0210112 A1 | 9/2005 | Clement et al. |
| 2005/0262208 A1 | 11/2005 | Haviv et al. |
| 2006/0242632 A1* | 10/2006 | Orsolini et al. ............... 717/140 |
| 2007/0086365 A1* | 4/2007 | Chen et al. .................... 370/260 |

* cited by examiner

AUDIO SEQUESTERING AND OPT-IN SEQUENCES FOR A CONFERENCE SESSION

TECHNICAL FIELD

This disclosure relates generally to the field of electronic conferencing call systems and conferencing resource management.

BACKGROUND

Modern conferencing systems facilitate communications among multiple participants over telephone lines, Internet protocol (IP) networks, and other data networks. In a typical conferencing session, a participant enters the conference by using an access number. During the conference a mixer receives audio and/or video streams from the participants, determines the N loudest speakers, mixes the audio streams from the loudest speakers and sends the mixed media back to the participants. Conferencing systems are often impacted by participants that are not actively involved in the conference session. For instance, conference session participants may locally place a call on hold, which, in turn, impacts the overall conference session and conferencing system. In other cases, a participant may subject other participants to various types of background noise, and in particular, "on hold" music that can be inadvertently broadcast into conference call when a participant places their phone on hold while connected to a conference. In some cases, the participant is not listening to the conference call while this is happening and is completely unaware that they are generating an annoyance.

Certain conferencing systems, such as Cisco's Unified MeetingPlace™, provide meeting management functions whereby users can mute and unmute themselves. Additionally, users with the appropriate authorization level can mute all of the other attendees, to hold a sidebar conference, for instance. However, a non-active conference session participant can still directly impact the entire conferencing system, due to the fact that most conferencing systems continue to dedicate resources to the non-active participant's session. This is a serious problem given that conference management platforms typically have a limited number of lines with associated direct costs. Inactive lines used by non-active participants draw directly from system resources and can generate unnecessary financial cost increases.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description, specific details are set forth, such as device types, system configurations, communication methods, etc., in order to provide a thorough understanding of the disclosure herein. However, persons having ordinary skill in the relevant arts will appreciate that these specific details may not be needed to practice the embodiments described.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Servers, mixers, control units, and personal computers are examples of the devices or nodes. These nodes typically communicate by exchanging discrete frames or packets of data according to predefined protocols.

In one embodiment, a conferencing system is operable to query for active participants, identifying non-responding participants, and quarantining or segregating the non-responding participants in order to manage, report and potentially remove inadvertently noisy and/or inactive callers. Conference participants who have been quarantined or segregated as non-responding or inattentive are prompted to "opt-in" to resume full participatory status in the conference session. Inattentive, negligent, or noisy conference callers who fail to properly opt back into the meeting have their resource usage reduced or are removed completely from the conference session, thereby preserving valuable conference system resources.

Figure 1:
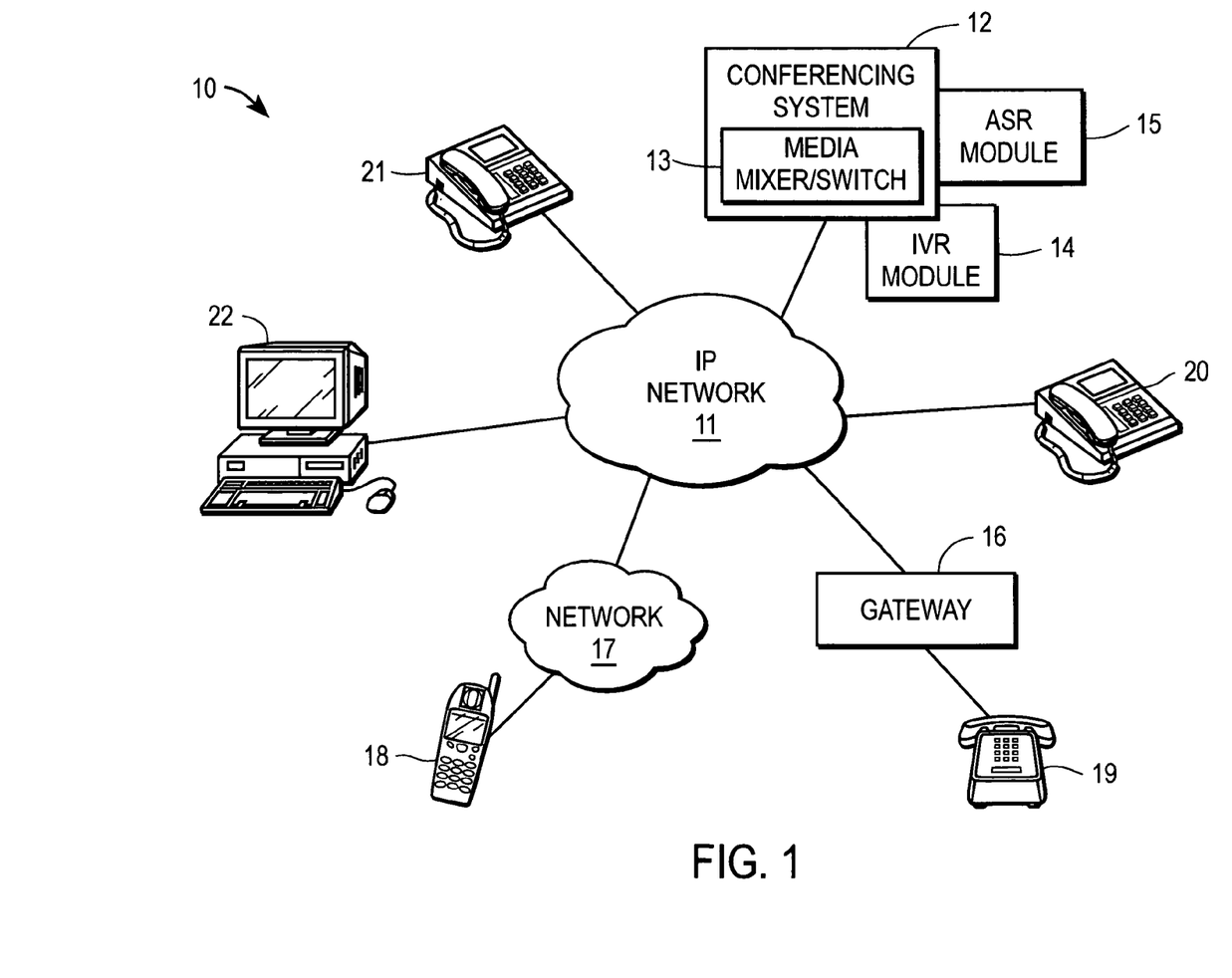
FIG. 1 illustrates an example communication network for a conferencing system.

Referring to FIG. 1, an example communication network 10 is shown including a conferencing system 12 (e.g., a server) coupled with, or which includes, a media mixer/switch 13 that mixes audio signals received from each of the conference or meeting participants, and may also mix or switch video signals. Conferencing system 12 may comprise a conferencing or meeting application that includes software (or firmware) plug-ins, modules, or enhancements that implement the various features and functions described herein. In a specific implementation, for example, conferencing system 12 may run a modified or enhanced IP communication system software product such as Cisco's MeetingPlace™ conferencing application that allows users to schedule and attend meeting conferences.

In the embodiment shown, conferencing system 12 handles all of the control plane functions of the audio conference session and manages audio transmissions and communications from the endpoints. In this example, the conference participants are shown by endpoint devices 18-22. Endpoint device 19 is an analog (audio-only) Plain-Old Telephone System (POTS) device connected with conferencing system 12 via gateway device 16 and IP network 11. Endpoint device 18 is a cellular telephone that is connected with conferencing system 12 via cellular telephone network 17 and IP network 11. Endpoint device 22 comprises a PC with built-in softphone capabilities (i.e., a PC that has phone capabilities installed or incorporated therein). Endpoint devices 20 & 21 are VoIP telephones with display capabilities that are connected with conferencing system 12 via IP network 11.

Generally, an endpoint represents an end user, client, or person who is capable of participating in a conference session via conferencing system 12. Other endpoint devices not specifically shown in FIG. 1 that may be used to initiate or participate in a conference session include a personal digital assistant (PDA), a laptop or notebook computer, a non-IP telephone device, or any other device, component, element, or object capable of initiating or participating in voice exchanges with conferencing system 12.

It is appreciated that the media path for the conference participants may include audio (voice) transmissions across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices (e.g., private branch exchange (PBX) systems, VoIP gateways, etc.). Practitioners in the arts will understand that each of the component modules and units shown in FIG. 1 may be implemented by hardware, firmware, or software component elements that implement the various functions described herein.

In one embodiment, media mixer/switch 13 comprises one or more digital signal processors (DSPs) or a firmware/software-based system that mixes audio signals received at its input ports under the control of system 12. The audio and/or video signals received at the conference server ports originate from each of the conference or meeting participants (e.g., individual conference participants using endpoint devices 16-17), and possibly from an interactive voice response (IVR) system module 14, which may be used to play an opt-in prompt script or sequence for notifying a user of an endpoint of the need to take affirmative action (as directed by the IVR script) in order to remain connected to the conference session.

As part of the process of mixing the transmissions of the participants in the conference session, conferencing system 12 and media mixer/switch 13 may create different output streams having a different combination of input streams for different participants. For example, in the case where endpoint 21 is one of the loudest speakers in the conference session, media mixer/switch 13 generates a mixed audio output to endpoint 21 that does not include the audio of endpoint 21. Conversely, the mixed output to endpoints 18-20 and 22 includes the audio generated by endpoint 21 since endpoint 21 is one of the loudest speakers. In this way, endpoint 21 does not receive an echo of its own audio output coming back from the audio mixer. Similarly, different participants may configure the conferencing system so that the media mixer/switch 13 delivers to them only some of the video streams produced by the other participants The example of FIG. 1 also includes an automatic speech recognition (ASR) module 14 associated with conferencing system 12. ASR module 14 may be utilized for interpreting and parsing speech of the participants—that is, to identify the words of a participant speaking into a microphone or telephone device. Various known natural language ASR programs/modules may be used in association with conferencing system 12.

Although the conferencing system is shown in FIG. 1 as a single box or entity, in various embodiments system 12 may comprise one or more audio bridges, multiple video mixers or switches, a conferencing server, authentication/admission applications, etc. Thus, even though the embodiment of FIG. 1 shows the media mixing and switching components being incorporated within conference system 12, in other embodiments they may comprise separate logical entities, either implemented on a single hardware unit or box, or by interconnected audio bridge, conferencing server and mixer components.

In one embodiment, conferencing system 12 constantly monitors the activity level of each of the participants to a conference session. When the system detects an excessive amount of noise received from a participant endpoint, or if a particular endpoint has been inactive for longer than a specified period of time, an IVR module may initiate a sequence of script to prompt the participant to provide an "opt-in" indication, thereby providing proof that the participant is still present on the conference. In other embodiments, the IVR module may be manually engaged by a conference participant, conference moderator, or conference organizer, by performing an input action such as a designated keystroke (such as ##5). In a situation where an offending (e.g., noisy) participant is detected, or if system resources need to be reclaimed in order to scale the conference session, the opt-in sequence immediately sequesters the offending participant. In other implementations, all of the participants to the conference session are sequestered. Sequestering involves muting the participant to the conference session by blocking or discarding audio and/or video packets received from their corresponding endpoint device.

Regardless of the triggering event, once the interactive script is invoked, one or more participants connected to a conference session via their corresponding endpoint devices are electronically prompted to provide an affirmative response in order to continue attending the conference session. In one embodiment, one or more of the participant endpoints are first sequestered or placed on hold. The conferencing system then provides instructions (via an IVR script) to the sequestered participants regarding how to re-join the conference call. For example, the IVR system may play a script such as, "You have been placed on hold, to re-join the call in progress, please press ##3." These instructions may be periodically repeated to ensure that the participant hears them. In order to rejoin the conference call each participant either responds accordingly or is removed from the conference session. Once removed from the conference session, the conferencing system resources dedicated to that participant are released.

The opt-in mechanism therefore forces each sequestered participant to "re-enroll" in order to once again become an active participant in the meeting. Consequently, it ensures that only persons who are actively attending the call (e.g., listening) can affirmatively respond to the IVR prompt in order to attest to their attendance, and thus be permitted to continue to attend the conference call. In one embodiment, failure to provide an affirmative response within a predetermined time period results in the removal of that participant (i.e., disconnected) from the conference session, and their conferencing resources released. In another embodiment, some but not all of the participant's conferencing resources are released, but the participant nominally remains in the conference.

Figure 2:
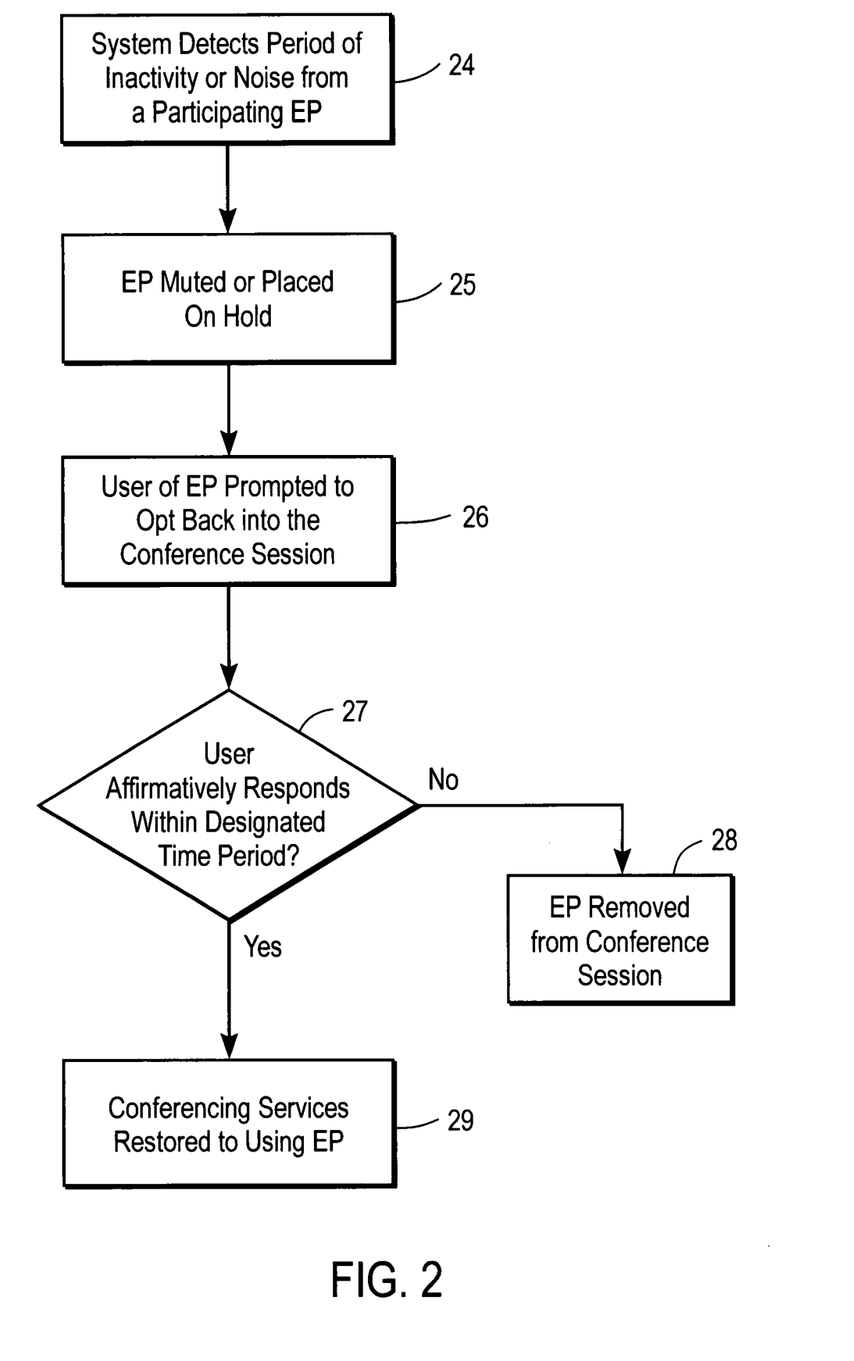
FIG. 2 illustrates an example method of operation for the system shown in FIG. 1.

FIG. 2 illustrates an example method of operation for the system shown in FIG. 1. The process begins when the conferencing system detects a period of inactivity or noise from a participating endpoint (block 24). For instance, the conferencing system may detect that no audio transmissions have been received from a particular endpoint for certain determined time period (e.g., 5 minutes). Alternatively, the conferencing system may detect audio packet transmissions that do not include human speech, categorizing the transmissions as noise. In either case, the system's response is to mute the endpoint audio and video streams, or otherwise place the endpoint on hold (block 25). At this time, the endpoint is effectively sequestered and removed from the conference session. However, some minimal conference resources dedicated to servicing the endpoint's participation in the conference session still remain in place.

Next, the user the sequestered (i.e., quarantined) endpoint is prompted by the IVR system to opt back into the conference session (block 26). At this point, the user must affirmatively respond to the IVR prompt within a designated time, as shown by decision block 27 in FIG. 2. If the user fails to respond affirmatively within a designated time period, the endpoint associated with that participant may be removed from the conference session or have its resource consumption further reduced (block 28). The conference resources previously dedicated to the conference session associated with the removed endpoint are thus released. Conversely, if the user of the sequestered endpoint responds affirmatively to the system's opt-in request, the conferencing services are fully restored to the user's endpoint, thereby allowing the user once again participate in the conference session.

Note that in certain embodiments, situations may arise where, instead of detecting inactivity or noise emanating from a participating endpoint, the system that detects that an endpoint is consuming a lot of excessive conferencing resources. For example, a user may be participating in a conference session using voice, video, and web-sharing resources. The system may detect that the user has been actively transmitting audio packets with some regularity, but has not been actively transmitting video packets, or has not been actively using the web-sharing resources dedicated to that endpoint. In this particular case, the system may be configured to release those resources that are not being actively used, followed by prompting the user with an opt-in script requesting an affirmative response in order to reattach the removed video and web-sharing resources.

In this manner, the conferencing system may free up inactive lines or ports used by inactive participants, where the inactivity is directed to a specific type of resource or particular type of use. In other words, a participant consuming a combination of cheap and expensive resources might be removed from the expensive resources (video and web-sharing) while the connection to the relatively cheap resource (audio) is preserved. For example, a participant using voice, video, and web conferencing may be removed from the video and web conferencing, then be prompted over the voice channel to opt back in to restore the video and web connections.

In yet another embodiment, the opt-in feature described above may be applied to a continuous meeting. A continuous meeting is a permanently convened conference, with some amount of resources permanently dedicated to it so that participants can enter the conference at any time. The opt-in feature may be periodically invoked by the system (e.g., scheduled on a time basis) and applied to participants to a continuous meeting in which participants often accidentally leave without disconnecting, thereby slowly causing resources to be seized unnecessarily. An example of a continuous meeting is an emergency response situation in which the telecommunications space and other management conference resources are ongoing. Periodic use of the opt-in feature for a continuous meeting therefore acts as a means of reclaiming unused resources from inattentive callers/participants.

Figure 3:
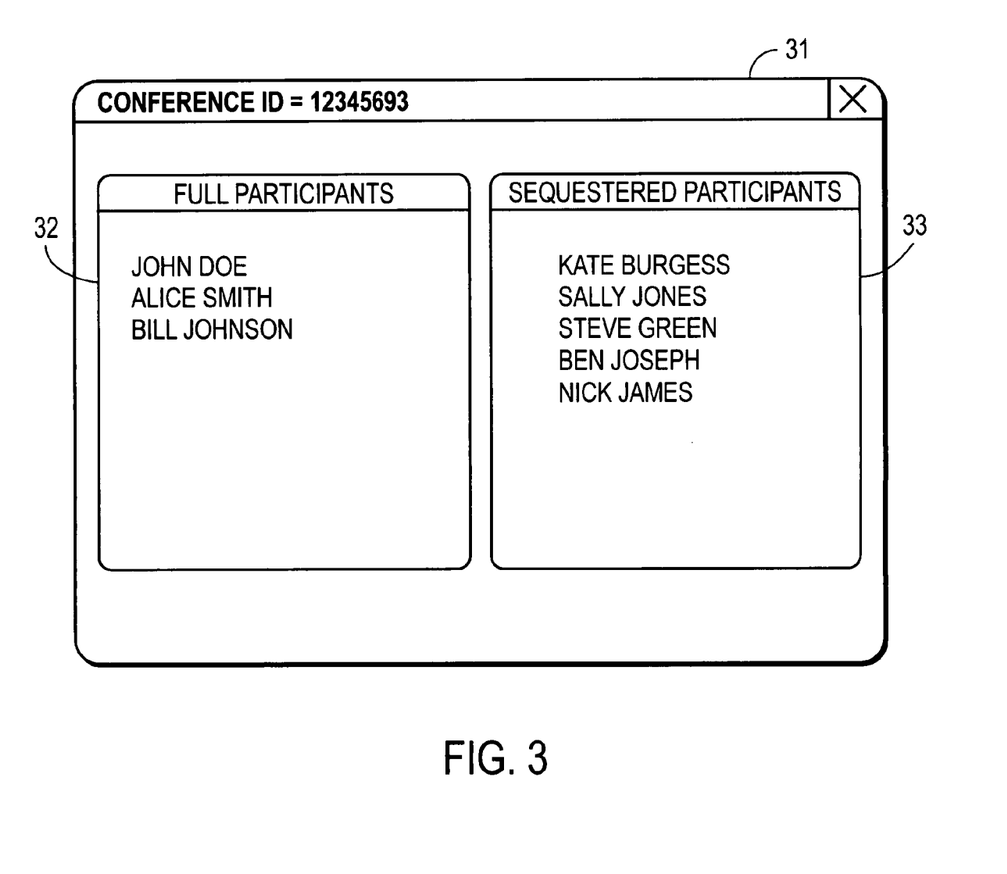
FIG. 3 illustrates an example user interface window associated with an application running on a PC of a conference moderator.

FIG. 3 illustrates an example user interface window 31 associated with an application running on a PC of a conference moderator. In this embodiment, instead of the system periodically prompting participants to rejoin a conference session, or automatically detecting inactivity or noise of a particular endpoint, a conference organizer/moderator, or other participant, may invoke a graphical user interface (GUI) used to manage conference resources effectively. The GUI shown in FIG. 3, for instance, may be generated by software (i.e., code) running the moderator's PC. In other cases, the GUI may comprise a collaborative web-based application that is accessed by the browser software running on the user's PC. In other instances, the GUI that produces window 31 may comprise a downloaded application, or other forms of computer-executable code that may be loaded or accessed by a participant's PC Graphical user interface window 31 includes a full participant field or window 32 and a field or window 33 that holds sequestered participants. When the conference begins, all participants are categorized and placed into the full participant field 32. Under control of the moderator or user of the graphical user interface, individual participants may be selected and dragged into the sequestered participant field 33. Once placed into sequestered field 33, the endpoint associated with the individual participants are attached to the IVR opt-in module, then muted or placed on hold. In certain specific implementations, resources associated with these individuals may also be released. In this way, a conference moderator is able to instigate or invoke the opt-in sequence. In a particular implementation, instead of releasing resources and having them opt-in to reattach the resources, the opt-in prompt may be configured with a timer for response. Here, the sequestered participant is notified that if they do not respond affirmatively within the specified amount of time, they will be removed from the conference and their dedicated resources released.

The GUI may be configured to allow a user to click, drag and drop the individual names from field 32 into field 33 using a mouse, keyboard, touch-screen, or other command input device. Alternatively, the moderator or user may click and drag one or more individuals from the sequestered field 33 back into the full participant field 32.

In still another variation of the embodiment shown in FIG. 3, the GUI may include a clickable button that automatically sequesters all participants. An opt-in script or sequence is then invoked to permit each of the individual sequestered participants to rejoin the conference session.

Figure 4:
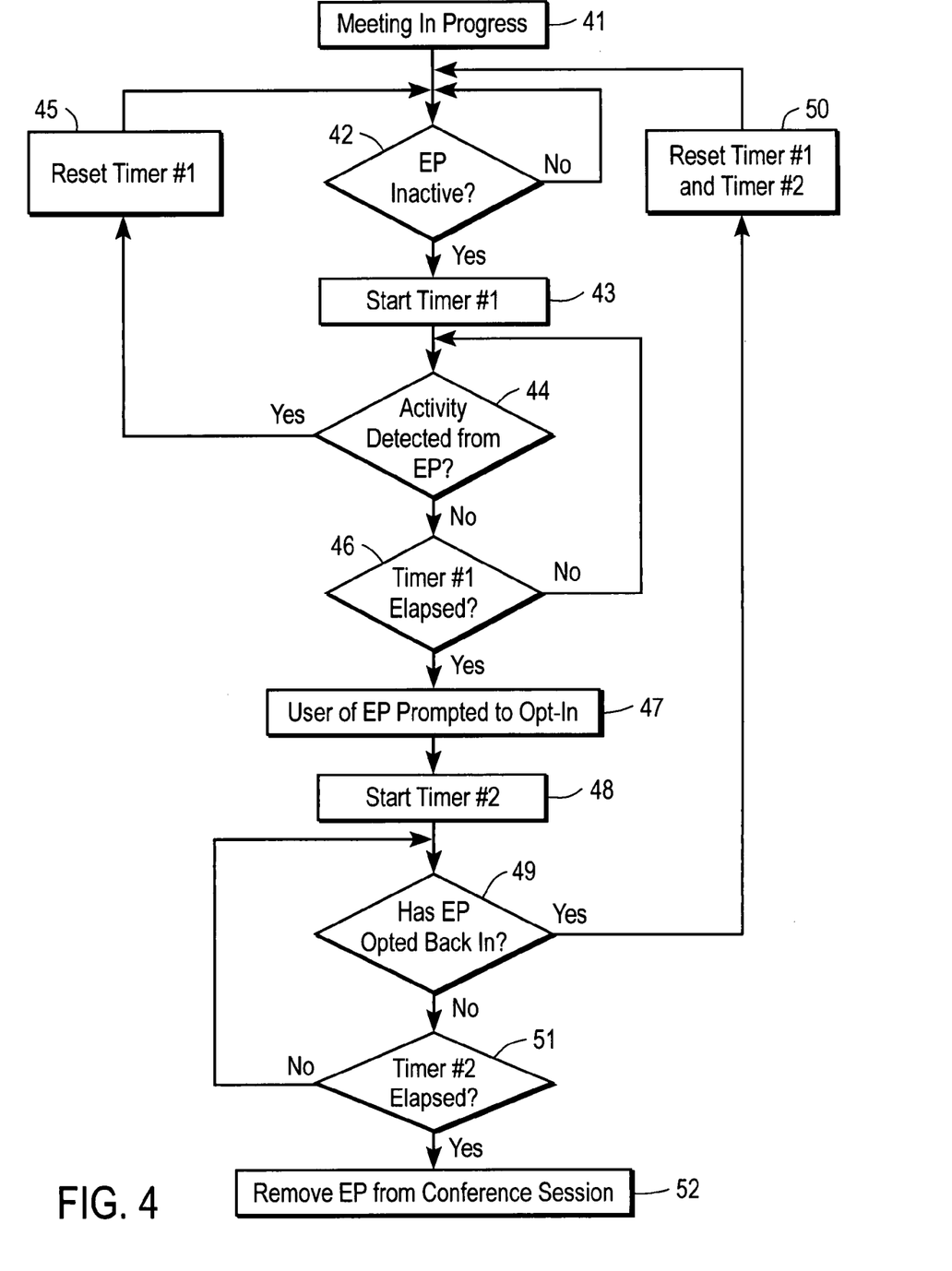
FIG. 4 illustrates another example method of operation for the system shown in FIG. 1.

FIG. 4 illustrates another example method of operation for the system shown in FIG. 1. In this example, a conference session is already established and in progress (block 41) among a group of participants calling from associated endpoints. The system constantly monitors the conference session to determine whether an endpoint is active (e.g., whether a participant using an endpoint is speaking), which is shown by block 42.

Once an endpoint is detected as being inactive, the system starts a first timer (block 43) which is used to count down a predetermined time interval. In the event that activity is detected from the endpoint (block 44) prior to the expiration of the first timer (block 46), that timer is reset (block 45) and the process returns to decision block 42 once again to monitor the endpoint for inactivity. If there is no activity from the endpoint during the predetermined time interval, i.e., the first timer elapses, then the system invokes an IVR script or sequence to prompt the user to opt back into the conference session (block 47).

After the user of the endpoint has been sent an opt-in prompt or notification that requires an affirmative response, the system starts a second timer (block 48). The purpose of the second timer is to grant the user an allotted period of time in which to respond affirmatively to the opt-in prompt. During this time, the opt-in prompt may be periodically replayed to ensure that the user hears it. If the user of the endpoint takes the necessary action to opt back into the conference (block 49), both the first and second timers are reset (block 50) and the system once again begins to monitor the activity of the endpoint (block 42). On the other hand, the user of the endpoint is inattentive or otherwise decides not to respond, the second timer eventually elapses (block 51), resulting in removal of the endpoint in the conference session and release of the resources previously dedicated to that endpoint (block 52). Alternatively, instead of removing the endpoint from the conference session, some or most of the resources dedicated to the endpoint may be removed.

Figure 5:
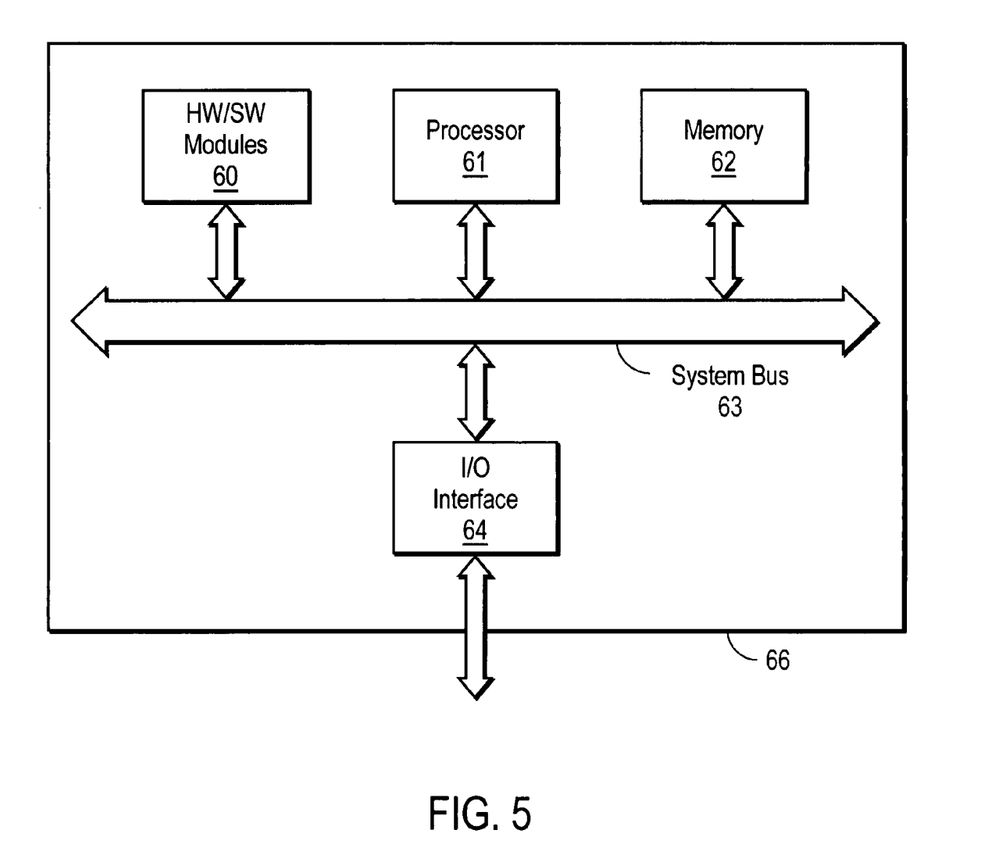
FIG. 5 illustrates an example network device or node.

FIG. 5 is a generalized block diagram showing an example network device or node 66, such as may comprise any of the systems, devices, or nodes (e.g., a PC or server) shown or described above. Node 66 includes a processor subsystem 61 coupled with a memory unit 62, one or more hardware/software modules 60, and an input/output (I/O) interface 64 via a system bus 63. Modules 60 may include software, firmware, or logic embedded in hardware for implementing any of the functions described herein, e.g., those functions associated with triggering an interactive prompting sequence that allows sequestered participants to a conference session to rejoin.

It is appreciated that any conferencing system utilized by, or in conjunction with, node 66 may comprise separate hardware devices coupled to the system bus 63, or, alternatively, implemented as software programs or modules 60 that run on one or more processors of subsystem 61. In other words, the conferencing system functions described above may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For instance, while the preceding examples contemplate a single server or node handling the entire conference session, the concepts discussed above are applicable to other systems that utilize distributed bridge components that distribute conferencing functions, management, and control over the conference session. Accordingly, the specification and drawings are to be regarded in an illustrative rather than a restrictive sense.

We claim:

1. A method comprising:
   sequestering, in response to a triggering event, a participant of a conference session by muting the participant to the conference session, the triggering event comprising the selection of the participant for sequestering;
   providing a graphical user interface (GUI) operable to:
      display all participants of the conference session; and
      permit a moderator to select from the GUI one or more of the participants in order to sequester the selected participants from the conference session;
   electronically prompting, in response to the triggering event, the sequestered participant connected to the conference session via a corresponding endpoint device to enter an affirmative response in order to re-join the conference session, the prompting comprising playing instructions via an interactive voice response (IVR) script regarding how the sequestered participant may re-join the conference session that the sequestered participant has previously been muted from; and
   disconnecting the participant from the conference session in the event that the affirmative response is not received within a predetermined time period.

2. The method of claim 1 further comprising periodically repeating the prompting of the participant to enter the affirmative response.

3. The method of claim 1 wherein muting the participant to the conference session comprises blocking or discarding audio packets received from the corresponding endpoint device.

4. The method of claim 1 wherein the triggering event comprises inactivity lasting a specified duration from the corresponding endpoint device of the participant.

5. The method of claim 1 wherein the triggering event comprises non-speech noise from the corresponding endpoint device of the participant.

6. The method of claim 1 wherein the triggering event comprises input received from an endpoint device associated with an administrator, moderator, or other participant to the conference session.

7. The method of claim 1 wherein the conference session comprises a continuous conference session.

8. A method comprising:
   sequestering, in response to a triggering event, a participant of a conference session by muting the participant to the conference session, the triggering event comprising the selection of the participant for sequestering;
   providing a graphical user interface (GUI) operable to:
      display all participants of the conference session; and
      permit a moderator to select from the GUI one or more of the participants in order to sequester the selected participants from the conference session;
   electronically prompting, in response to the triggering event, the sequestered participant connected to the conference session via a corresponding endpoint device to enter an affirmative response in order to re-join the conference session, the prompting comprising playing instructions via an interactive voice response (IVR) script regarding how the sequestered participant may re-join the conference session that the sequestered participant has previously been muted from; and
   releasing conference resources dedicated to the participant in the event that the affirmative response is not received within a predetermined time period.

9. The method of claim 8 further comprising periodically repeating the prompting of the participant to enter the affirmative response.

10. The method of claim 8 wherein muting the participant to the conference session comprises blocking or discarding audio packets received from the corresponding endpoint device.

11. The method of claim 8 wherein the conference resources comprises video and/or web-sharing resources.

12. A method comprising:
   detecting non-speech noise or inactivity of a certain duration from an endpoint device associated with a participant to a conference session;
   sequestering, in response to detecting non-speech noise or inactivity of the certain duration from the endpoint device associated with the participant, the participant by muting audio packets received from the endpoint device;

providing a graphical user interface (GUI) operable to:
  display all participants of the conference session; and
  permit a moderator to select from the GUI one or more of the participants in order to sequester the selected participants from the conference session;
periodically electronically prompting, via playing instructions in an interactive voice response (IVR) script regarding how the sequestered participant may re-join the conference session that the sequestered participant has previously been muted from, the sequestered participant to enter an affirmative response in order to re-join the conference session; and
removing some or all conference resources dedicated to the participant in the event that the affirmative response is not received within a predetermined time period.

13. The method of claim 12 wherein the conference resources comprise audio, video and/or web-sharing resources.

14. A method comprising:
periodically sequestering, by a conferencing system, one or more callers to a conference call by placing the callers on hold;
providing a graphical user interface (GUI) operable to:
  display all participants of the conference call; and
  permit a moderator to select from the GUI one or more of the participants in order to sequester the selected participants from the conference call;
prompting, via playing instructions in an interactive voice response (IVR) script regarding how the sequestered callers may re-join the conference session in which the sequestered callers have previously been placed on hold, each of the one or more callers to enter an affirmative response in order to return to the conference call; and
removing from the conference call individual ones of the callers who fail to provide an affirmative response within a predetermined time period.

15. The method of claim 14 further comprising releasing a subset of, or all, conference resources dedicated to each of the individual ones of the callers who fail to provide an affirmative response within the predetermined time period.

16. The method of claim 15 wherein the subset of conference resources comprises video and/or web-sharing resources.

17. One or more computer-readable non-transitory storage media embodying logic that is operable when executed by one or more processors to:
sequester, in response to a triggering event, a participant of a conference session by muting the participant to the conference session, the triggering event comprising the selection of the participant for sequestering;
provide a graphical user interface (GUI) operable to:
  display all participants of the conference session; and
  permit a moderator to select from the GUI one or more of the participants in order to sequester the selected participants from the conference session;
prompt, via playing instructions via an interactive voice response (IVR) script regarding how the sequestered participant may re-join the conference session that the sequestered participant has previously been muted from, the participant connected to the conference session via a corresponding endpoint device to enter an affirmative response in order to re-join the conference session;
remove the participant from the conference session in the event that the affirmative response is not received within a predetermined time period; and
release conference resources dedicated to the removed participant.

18. The one or more computer-readable non-transitory storage media of claim 17 wherein muting the participant to the conference session comprises blocking or discarding audio packets received from the corresponding endpoint device.

19. The one or more computer-readable non-transitory storage media of claim 17 wherein the logic, when executed, is further operable to detect non-speech noise, or inactivity lasting a specified duration, from the corresponding endpoint device, thereby causing the logic to prompt the participant to enter the affirmative response.

20. The one or more computer-readable non-transitory storage media of claim 17 wherein the logic, when executed, is further operable to prompt, via the interactive script, all other participants connected to the conference session to enter an affirmative response within the predetermined time period or else be removed from the conference session.

21. The one or more computer-readable non-transitory storage media of claim 17 wherein the logic, when executed, is further operable to receive input from an endpoint device associated with an administrator, moderator, or other participant to the conference session, the input causing the logic to prompt the participant to enter the affirmative response.

22. A system comprising:
one or more network nodes running one or more application programs that implement an electronic conferencing call system, the one of the nodes including:
  one or more processors; and
  a memory comprising one or more instructions executable at the processors, the one or more processors being operable, when executing the instructions, to:
    mute, responsive to triggering input, a participant to a conference call by blocking or discarding audio packets received from an endpoint device associated with the participant, the triggering input comprising the selection of the participant for muting;
    provide a graphical user interface (GUI) operable to:
      display all participants of the conference call; and
      permit a moderator to select from the GUI one or more of the participants in order to mute the selected participants from the conference call;
    prompt, via playing instructions in an interactive voice response (IVR) script regarding how the muted participant may re-join the conference session that the muted participant has previously been muted from, the muted participant to enter an affirmative response in order to re-join the conference call;
    disconnect the participant from the conference session in the event that the affirmative response is not received within a predetermined time period; otherwise
    unmute the participant in the event that the affirmative response is received within the predetermined time period.

23. The system of claim 22 wherein the one of the nodes comprises a conferencing server.

24. The system of claim 22 wherein the one or more network nodes is further operable to release conference resources dedicated to the disconnected participant.

25. The system of claim 22 wherein the triggering input comprises detection of non-speech noise, or inactivity lasting a specified duration, from the endpoint device.

26. The system of claim 22 wherein the triggering input comprises input received from an endpoint device associated with an administrator, moderator, or other participant to the conference call.

27. The system of claim 22 wherein the triggering input comprises periodic input received from a timer.

28. The method of claim 4, further comprising:
monitoring activity levels of a plurality of participants of the conference session; and
determining whether the participant has been inactive in the conference session for the specified duration.

\* \* \* \* \*